United States Patent [19]

Murata et al.

[11] Patent Number: 5,325,182
[45] Date of Patent: Jun. 28, 1994

[54] VIDEO SIGNAL PROCESSING CIRCUIT INCORPORATED IN A INTEGRATED CIRCUIT

[75] Inventors: Haruhiko Murata, Moriguchi; Yukio Mori, Yawata; Akihiro Maenaka, Moriguchi; Masao Takuma, Toyonaka; Kiyotada Kawakami, Osaka; Tooru Yamamoto, Daito; Tooru Asaeda, Ikoma, all of Japan

[73] Assignee: Sanyo Electric Co., Ltd., Moriguchi, Japan

[21] Appl. No.: 903,075

[22] Filed: Jun. 22, 1992

[30] Foreign Application Priority Data

Jun. 21, 1991 [JP] Japan .................................. 3-150365
Mar. 10, 1992 [JP] Japan .................................. 4-51667

[51] Int. Cl.$^5$ ........................ H04N 9/64; H04N 9/78; H04N 5/20; H04N 5/202
[52] U.S. Cl. .................................. 348/663; 348/675; 348/704; 348/708
[58] Field of Search ................. 358/31, 32, 22, 21 R, 358/909, 906, 310, 335, 180, 160, 209, 174; H04N 9/64, 5/20, 5/202, 5/52, 9/78

[56] References Cited

U.S. PATENT DOCUMENTS

| | | | |
|---|---|---|---|
| 4,302,776 | 11/1981 | Taylor et al. | 358/180 |
| 4,660,081 | 4/1987 | Heerah | 358/22 |
| 4,661,987 | 4/1987 | Anderson et al. | 358/160 |
| 4,774,581 | 9/1988 | Shiratsuchi | 358/180 |
| 4,862,270 | 8/1989 | Nishio | 358/160 |
| 5,008,739 | 4/1991 | D'Luna et al. | 358/21 R |
| 5,008,752 | 4/1991 | Van Nostrand | 358/180 |
| 5,083,208 | 1/1992 | Hatanaka | 358/180 |
| 5,134,487 | 7/1992 | Taguchi et al. | 358/909 |
| 5,148,281 | 9/1992 | Nakamura et al. | 358/909 |

FOREIGN PATENT DOCUMENTS

| | | | |
|---|---|---|---|
| 0157474 | 7/1987 | Japan | H04N 5/20 |
| 0193772 | 8/1988 | Japan | H04N 5/202 |
| 4284068 | 10/1992 | Japan | H04N 5/202 |
| 4319871 | 11/1992 | Japan | H04N 5/202 |

Primary Examiner—James J. Groody
Assistant Examiner—John W. Miller
Attorney, Agent, or Firm—Armstrong, Westerman, Hattori, McLeland & Naughton

[57] ABSTRACT

A video signal processing circuit is incorporated in an IC for camcorder in which a camera signal outputted from a CCD image sensor is processed in a digital manner such that luminance and color signals can be outputted. In the IC, a vertical interpolation circuit produces two kinds of vertically interpolated data on the basis of a digital camera signal of one channel within an image area being set by an electronic zoom function. A YC separation circuit receives the two kinds of vertically interpolated data, and an output of the YC separation circuit is applied a horizontal interpolation circuit or an RGB composition circuit. If the YC separation output is applied to the horizontal interpolation circuit, the same outputs two kinds of horizontally interpolated data upon which three primary color signals are composed by the RGB composition circuit. If the YC separation output is applied to the RGB composition circuit, the horizontal interpolation circuit produces two kinds of horizontally interpolated data on the basis of three primary color data outputted by the RGB composition circuit.

3 Claims, 16 Drawing Sheets

FIG. 2

COLOR FILTER

| G+B | R+G | G+B | R+G |
| --- | --- | --- | --- |
| G | R+B | G | R+B |
| G+B | R+G | G+B | R+G |
| R+B | G | R+B | G |

CAMERA SIGNAL OF ODD FIELD

| 2G+B | 2R+G+B | 2G+B |
| --- | --- | --- |
| R+G+2B | R+2G | R+2G |

CAMERA SIGNAL OF EVEN FIELD

| 2G+B | 2R+G+B | 2G+B | 2R+G+B |
| --- | --- | --- | --- |
| R+G+2B | R+2G | R+G+2B | R+2G |

VIDEO SIGNAL PROCESSING CIRCUIT INCORPORATED IN A INTEGRATED CIRCUIT

BACKGROUND OF THE INVENTION

1. Field of the Invention

The present invention relates to a video signal processing circuit incorporated in an integrated circuit, which receives a digital camera signal obtained through an A/D conversion of an analog camera signal which is outputted by an image sensor, and performs a digital signal processing so as to produce a luminance signal and a color signal.

2. Description of the Prior Art

A video camera having an electronic zoom function is disclosed in the third section with entitled "A Digital Processing Technique for a VTR with Camera" of the proceedings for the lecture meeting in the name of "making a video camera high performance and high quality" held under the promotion of Giken Joho Senta on Nov. 19 and 20, 1990. In these proceedings, there is disclosed a technique for enlarging lines within a zoom designation area set by an electronic zoom in both a horizontal direction and a vertical direction by means of interpolation. Such an electronic zoom function performs at a succeeding stage of a signal processing at the same timing as in an electronic image stabilizer for compact camcorder.

Space saving does not become a problem in a case where a plurality of integrated circuits are used for the signal processing and the electronic zooming as done in the prior art as described above. However, a problem occurs in the space saving in a case where it is intended to incorporate respective functions of the signal processing and the electronic zooming in a single integrated circuit chip. A portion that needs a large space in incorporating the functions in a single integrated circuit chip is a portion wherein line memories are to be formed, and therefore, if the number of line memories is increased, a space of an integrated circuit cannot be reduced.

In the above described prior art, at least two line memories are required for signal processings of synchronization of color signals, forming of a vertical aperture signal, and a total of etc., and three line memories are required for the luminance signal and two differential color signals in the electronic zoom portion.

SUMMARY OF THE INVENTION

Therefore, a principal object is to provide a novel video signal processing circuit suitable for being incorporated in an integrated circuit.

Another object of the present invention is to provide a video signal processing circuit in which the number of line memories can be reduced in comparison with the prior art.

Another object of the present invention is to provide a video signal processing circuit with less duplication of circuits.

Another object of the present invention is to provide a video signal processing circuit in which an image quality can be increased by effectively arranging a knee correction circuit which suppresses a change of a highlight portion.

The present invention is a single-chiped integrated circuit which performs a signal processing as well as a zoom processing, characterized in that Y/C separation means is provided at a succeeding stage of vertical interpolation means to which a digital camera signal of one channel is inputted, and an Y/C separation output is supplied to horizontal interpolation means and color signal composition means in this order or vice versa.

In addition, the present invention includes gamma correction means for gamma-correcting a digital luminance signal after Y/C separation and knee correction means provided at a succeeding stage of the gamma correction means, both of which are incorporated in a single integrated circuit, the knee correction means having an input/output characteristic which is a first linear line with a first incline within a first range where the input level is low and a second linear line with a second incline smaller than the first incline within a second range where the input level is larger than that of the first range.

Therefore, in the present invention, the digital camera signal of one channel is converted into two channel signals having different color information by the vertical interpolation means, and the two channel signals are converted into two kinds of differential color data which are synchronized with each other in two-channel Y/C separation means, and thereafter, the horizontal interpolation processing is performed and then RGB signals are composed, or the horizontal interpolation processing is performed after the composition of RGB signals. Therefore, according to the present invention, it is possible to perform all the interpolation processings with only three line memories provided in the vertical interpolation circuit.

In addition, in the present invention, since a gain in the vicinity of a changing point of the knee correction is made small in advance by performing the knee correction with the digital luminance signal after the gamma correction, a change in the amount in the vicinity of the changing point becomes small. Therefore, an image quality can be increased.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a relationship between a color filter arrangement of an image sensor and a camera signal;

DETAILED DESCRIPTION OF THE PREFERRED EMBODIMENTS

Figure 1:
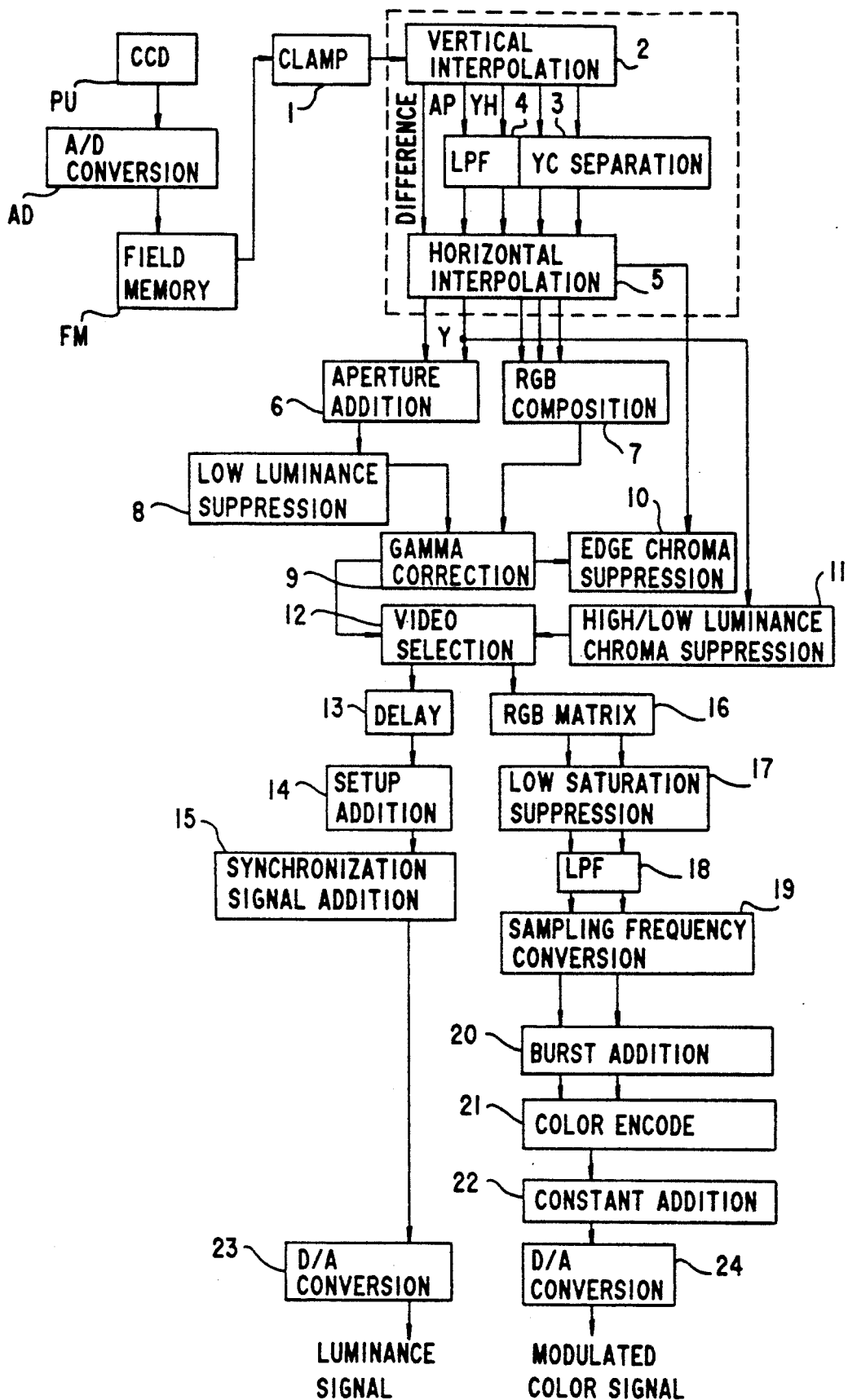
FIG. 1 is a block diagram showing a video signal processing circuit according to a first embodiment of the present invention.

Hereinafter, the present invention will be described in accordance with one embodiment shown in the drawings. At first, FIG. 1 shows a whole block diagram of a first embodiment, and FIG. 2 through FIG. 15 show specific block diagrams or explanatory views of respective blocks shown in FIG. 1.

At a preceding stage of an integrated circuit for the digital camera of this embodiment shown, there are provided with a CCD solid-state image sensor PU which is provided with a color filter, and an A/D conversion circuit AD.

Preliminary Processing

The color filter of a mosaic fashion is adhered to a surface of the solid-state image sensor PU. FIG. 2 shows a relationship between an arrangement of the complementary color filter of the solid-state image sensor PU and a camera signal outputted therefrom. A left portion of FIG. 2 shows an arrangement of a light-transmissible color filter for four picture elements in both the horizontal and vertical directions. The first line is formed by repetitions of (R+B) and (R+G), the second line is formed by repetitions of (G) and (R+B), the third line is formed by repetitions having a reverse phase with respect to the repetitions of the first line, and the fourth line is formed by repetitions having a reverse phase with respect to the repetitions of the second line. Such an arrangement of the complementary color filter is repeated in both of the vertical and horizontal directions. Then, as shown in a center portion of this figure, a camera signal or image pick-up signal of an odd field is composed of an output obtained by adding outputs of the first line and the second line and an output obtained by adding outputs of the third line and the fourth line. In addition, as shown in a right portion of this figure, a camera signal or image pick-up signal of an even field is composed of an output obtained by adding outputs of the second line and the third line and an output obtained by adding outputs of the fourth line and the fifth line. Therefore, the camera signal becomes the same signal in either the odd field or the even field but image pick-up positions are different from each other. That is, the same kind of camera signal is produced at every two lines.

The camera signal is dot-sequentially converted into a digital camera signal by an A/D conversion circuit AD in a manner that each dot or picture element is represented by ten bits. However, the solid-state image sensor has different densities in the horizontal direction according to the number of dots. More specifically, a clock frequency is set as 4 fsc for the image sensor having 400,000 picture elements, and a clock frequency is set as 8/3 fsc for the image sensor having 270,000 picture elements. Therefore, in a signal processing after the A/D conversion, a clock frequency for signal processing is made be coincident with the above described clock frequency in accordance with the density of the picture elements of the image sensor.

An output obtained through the A/D conversion, that is, the digital camera signal is temporarily stored in a field memory FM. From the field memory FM, only the digital camera signal within a zoom designation area that is set by an electronic zooming function is selectively read-out in synchronous with processing timings.

Clamp

In the above-described embodiment, a digital camera IC (integrated circuit) for receiving and processing the digital camera signal read-out from the field memory FM is provided. First, the digital camera signal is inputted to a clamp circuit 1 included in the IC. Although not shown in detail, the clamp circuit 1 performs a clamping operation by subtracting an average value of the camera signal data that is withdrawn in a horizontal blanking period, of a shaded portion from the camera signal data to which a predetermined value has been added. The reason why the predetermined value is added to the camera signal data is that a negative component of a high frequency noise cannot be sliced so as to be left before the high frequency noise is cut-off by a low pass-filter at the succeeding stage.

Vertical interpolation

A clamped output is inputted to a vertical interpolation circuit 2 for the electronic zoom processing. The electronic zoom is a function for converting the camera signal obtained from a restricted image pick-up area that is specified by a zooming operation by an user into a predetermined camera signal by means of interpolation. More specifically, the vertical interpolation circuit 2 approximately specifies positions of effective lines at a state where an interval between the lines is divided into eight equal parts within the zoom designation area under a zooming condition being set by the user, and forms effective lines through interpolation utilizing a proportional allocation method and performs necessary signal processings.

Figure 3:
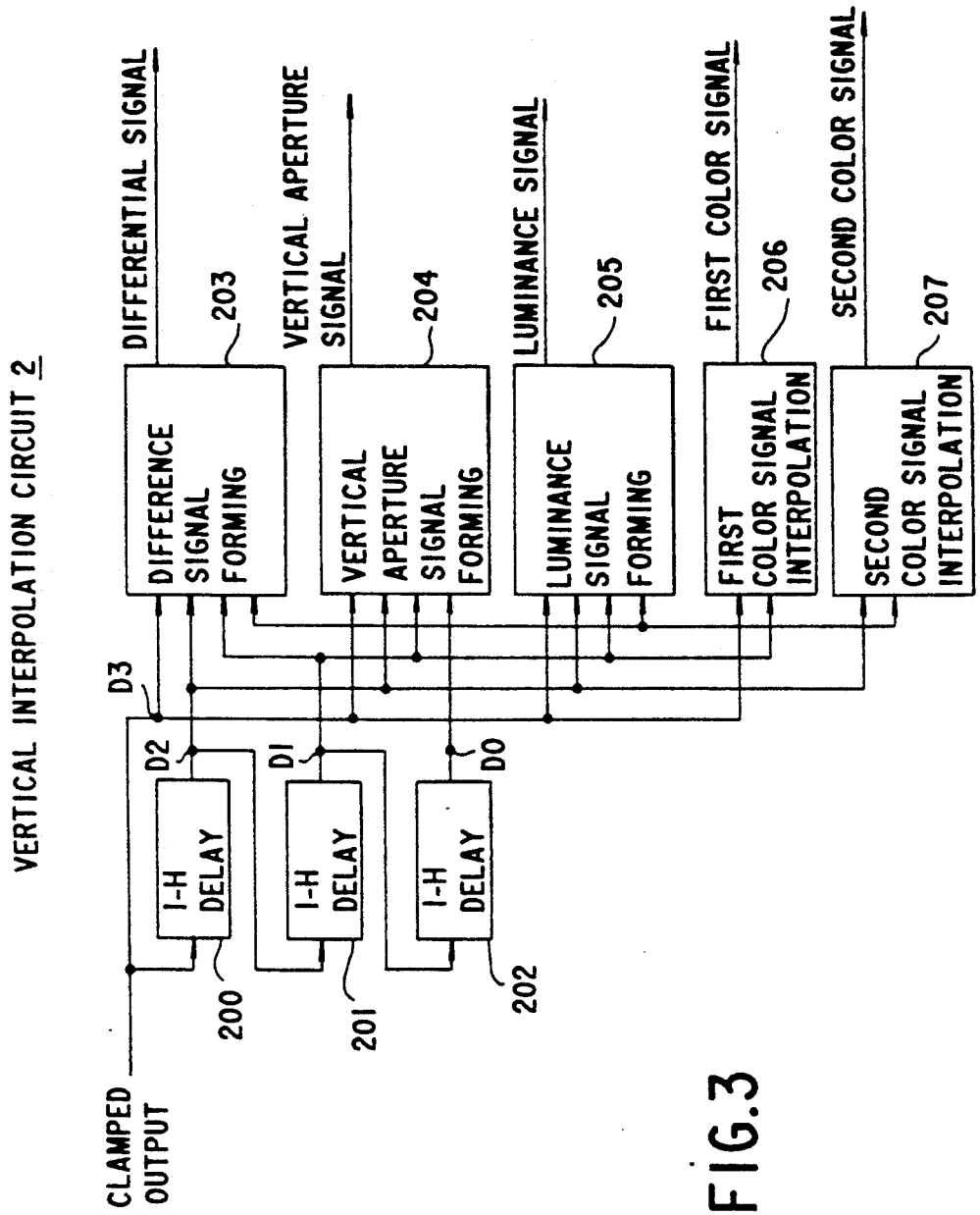
FIG. 3 is a block diagram specifically showing of a vertical interpolation circuit shown in FIG. 1.

As shown in FIG. 3, the clamped camera signal data is applied to a differential signal forming circuit 203, a vertical aperture signal forming circuit 204, a luminance signal forming circuit 205, and a first and second color signal interpolation circuits 206 and 207, respectively, together with delayed outputs from three one-line (1H) delay circuits 200-202.

Figure 4:
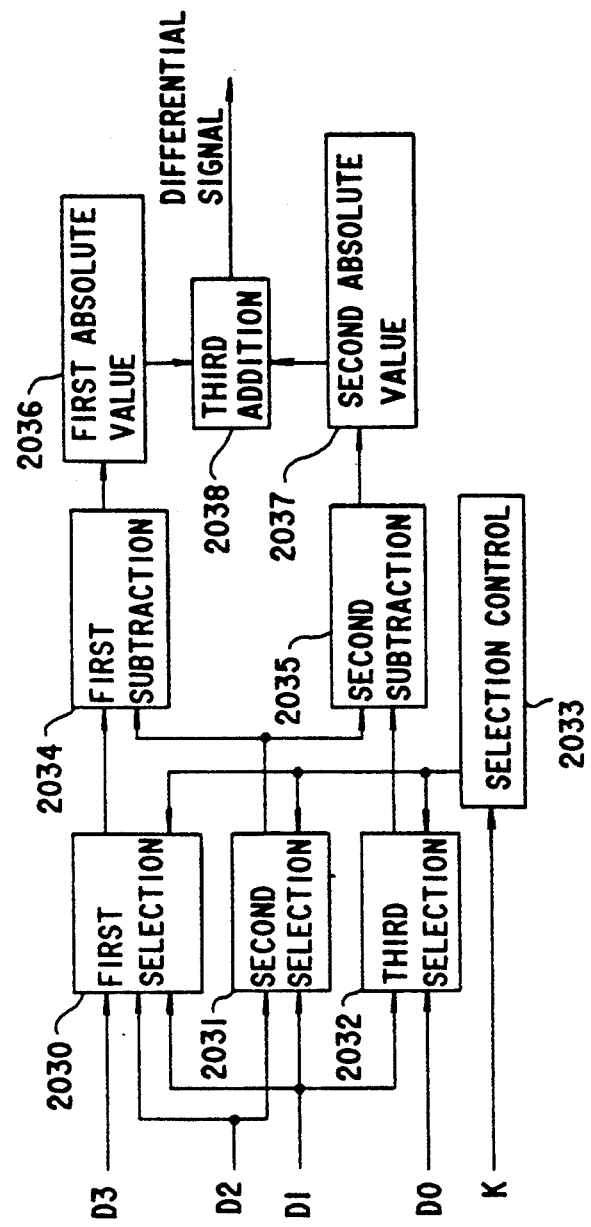
FIG. 4 is a block diagram specifically showing a differential signal forming circuit shown in FIG. 3.

FIG. 4 shows a block diagram of the differential signal forming circuit 203 in detail. In FIG. 4, a first selection circuit 2030 receives a clamped output D3, a 1-H delayed output D2 and a 2-H delayed output D1. A second selection circuit 2031 receives the 1-H delayed output D2 and the 2-H delayed output D1, and a third selection circuit 2032 receives the 2-H delayed output D1 and a 3-H delayed output D0.

A selection control circuit 2033 supplies to the selection circuits selection signals according to a proportional allocation coefficient K between the lines. The proportional allocation coefficient K is approximated to a value between "0" and "1" with a unit of $\frac{1}{8}$. In addition, the value of the coefficient K may be changed for each line. The selection control circuit 2033 generates the selection signals according to such proportional allocation coefficient K.

Then, the first selection circuit 2030 selects the output D2 when the coefficient K is less than "$\frac{1}{2}$", or the output D1 when the coefficient K is "$\frac{1}{2}$", or the output D2 when the coefficient K is not less than "$\frac{1}{2}$". The second selection circuit 2031 selects the output D1 when the coefficient K is less than "$\frac{1}{2}$", or the output D2 when the coefficient K is not less than "$\frac{1}{2}$". The third selection circuit selects the output D0 when the coefficient K is less than "$\frac{1}{2}$", or the output D1 when the coefficient K is not less than "$\frac{1}{2}$". A first selected output and a second selected output are inputted to a first subtraction circuit 2034, and the second selected output and a third selected output are inputted to a second subtraction circuit 2035. As a result, subtracted outputs as shown in the following table 1 are withdrawn in accordance with the value of the coefficient K.

TABLE 1

| Condition | First Subtraction | Second Subtraction | Difference Data |
|---|---|---|---|
| K < $\frac{1}{2}$ | D2 − D1 | D0 − D1 | \| D2 − D1 \| + \| D0 − D1 \| |
| K = $\frac{1}{2}$ | D1 − D2 | D1 − D2 | \| D1 − D2 \| + \| D1 − D2 \| |
| K > $\frac{1}{2}$ | D3 − D2 | D1 − D2 | \| D3 − D2 \| + \| D1 − D2 \| |

K = 0/8∼7/8

Respective subtracted outputs are inputted to first and second absolute value circuits 2036 and 2037 in which the respective subtracted outputs are converted into absolute values. The absolute value of the first subtracted output and the absolute value of the second subtracted output are added to each other by a third addition circuit 2038, whereby the differential signal can be withdrawn from the addition circuit 2038. The differential signal is a value obtained by converting a changing amount in the vertical direction into an absolute value.

Furthermore, a vertical aperture signal forming circuit 204 shown in FIG. 3 performs a quadratic differential in the vertical direction and outputs a result thereof as a vertical aperture signal AP, while performing an adding operation of the four inputs D0–D3 by modifying an operation coefficient according to the value of the proportional allocation coefficient K as shown in the following Table 2.

TABLE 2

| K | Coefficient of D0 | Coefficient of D1 | Coefficient of D2 | Coefficient of D3 |
|---|---|---|---|---|
| 0/8 | −4/16 | 8/16 | −4/16 | 0/16 |
| 1/8 | −4/16 | 7/16 | −2/16 | −1/16 |
| 2/8 | −4/16 | 6/16 | 0/16 | −2/16 |
| 3/8 | −4/16 | 5/16 | 2/16 | −3/16 |
| 4/8 | −4/16 | 4/16 | 4/16 | −4/16 |
| 5/8 | −3/16 | 2/16 | 5/16 | −4/16 |
| 6/8 | −2/16 | 0/16 | 6/16 | −4/16 |
| 7/8 | −1/16 | −2/16 | 7/16 | −4/16 |

TABLE 2-continued

| K | Coefficient of D0 | Coefficient of D1 | Coefficient of D2 | Coefficient of D3 |
|---|---|---|---|---|

Similarly, a high frequency region luminance signal forming circuit 205 shown in FIG. 3 performs an adding operation of the respective four inputs D0–D3 so as to output a high frequency region luminance signal YH by respective multiplying coefficient according to the proportional allocation coefficient K by the four inputs as shown in the following Table 3.

TABLE 3

| K | Coefficient of D0 | Coefficient of D1 | Coefficient of D2 | Coefficient of D3 |
|---|---|---|---|---|
| 0/8 | 4/32 | 24/32 | 4/32 | 0/32 |
| 1/8 | 3/32 | 22/32 | 7/32 | 0/32 |
| 2/8 | 2/32 | 20/32 | 10/32 | 0/32 |
| 3/8 | 1/32 | 18/32 | 13/32 | 0/32 |
| 4/8 | 0/32 | 16/32 | 16/32 | 0/32 |
| 5/8 | 0/32 | 13/32 | 18/32 | 1/32 |
| 6/8 | 0/32 | 10/32 | 20/32 | 2/32 |
| 7/8 | 0/32 | 7/32 | 22/32 | 3/32 |

The vertical aperture signal and the high frequency region luminance signal obtained as results of the above described operations are received by a low-pass filter 4 (FIG. 1) and outputted therefrom in a form such that high frequency region noise components are removed.

A first color signal interpolation circuit 206 shown in FIG. 3 receives the clamped output D3 and the second delayed output D1, and multiplies K/2 and (2−K)/2 by the clamped output D3 and the second delayed output D1, respectively, and then, performs an adding operation of multiplied results. Furthermore, a second color signal interpolation circuit 207 shown in FIG. 2 receives the third delayed output D0 and the first delayed output D2 by which (1−K)/2 and (1+K)/2 are multiplied, respectively, and then, performs an adding operation of multiplied results. In other words, the color signal interpolation circuits 206 and 207 produces two kinds of interpolated data for each line by using a proportional allocation method on the basis of the camera signal of the lines which commonly includes the same color information so as to perform a synchronization of the color information.

Y/C Separation

Figure 5:
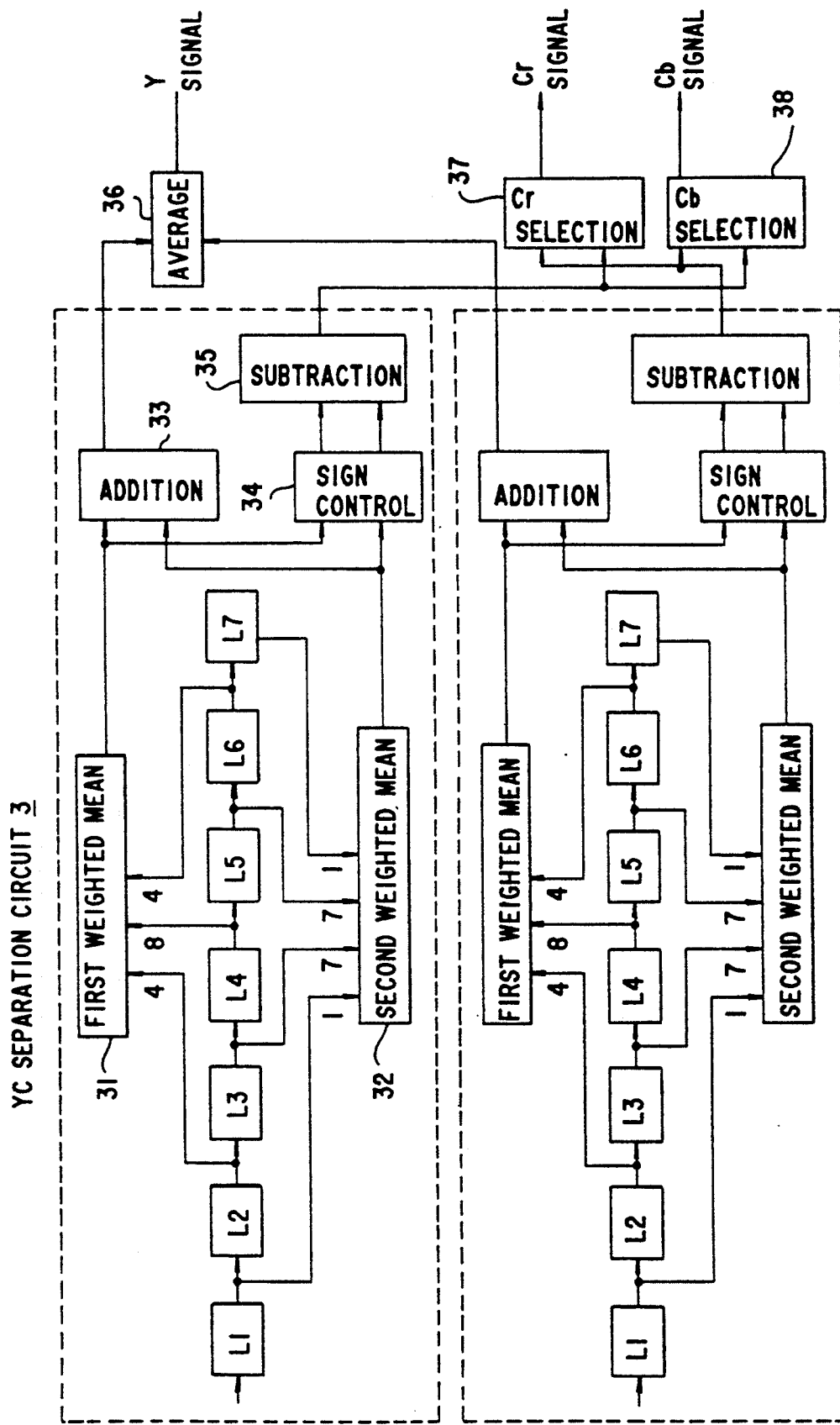
FIG. 5 is a block diagram specifically showing a Y/C separation circuit shown in FIG. 1.
Figure 8:
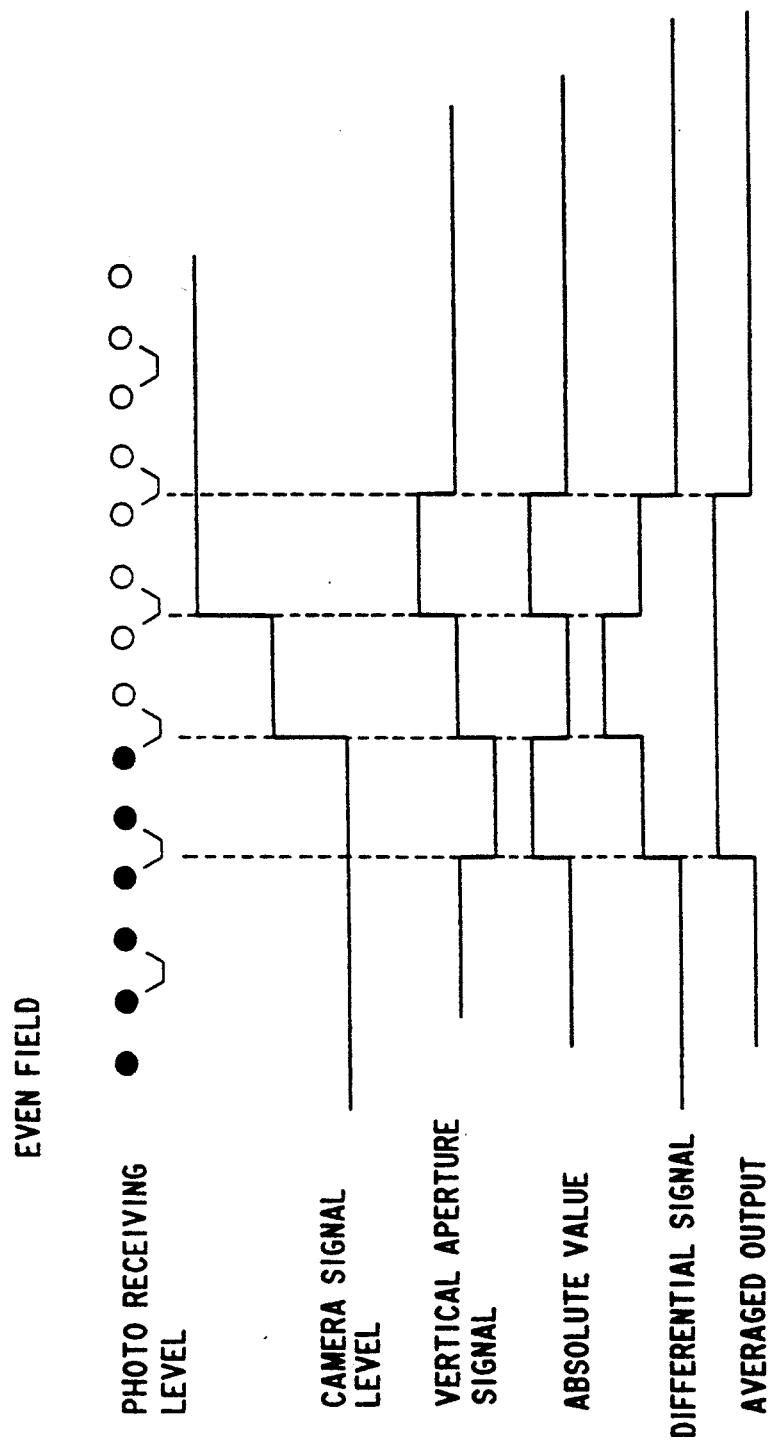
FIG. 8 is an illustrative view showing a principle of the edge chroma suppression in an even field performed in an edge chroma suppression circuit shown in FIG. 1.

A first interpolated signal data and a second interpolated signal data are inputted to a Y/C separation circuit 3 shown in detail in FIG. 5. The Y/C separation circuit 3 includes the same two circuits with respect to the interpolated signals, as shown in FIG. 8, and the same circuit operates so as to perform the same function.

First, one of the circuits will be described. The interpolated data is inputted to seven data latch circuits L1–L7 connected to each other in a cascade fashion. Each of the latch circuits L1–L7 delays the interpolated data one by one picture element or dot. A weighted mean of second, fourth and sixth delayed outputs is evaluated by a first weighted mean circuit 31 at a ratio of 4:8:4. a weighted mean of first, third, fifth and seventh delayed outputs is also evaluated by a second weighted mean circuit 32 at a ratio of 1:7:7:1. By performing the second weighted mean operation, a proportional allocation processing can be performed in synchronous with the fourth delayed output, and therefore,

| 7/8 | −1/16 | −2/16 | 7/16 | −4/16 | the synchronization in the horizontal direction is effected. In addition, it is possible to remove high frequency noise components of the interpolated data by evaluating the weighted means of the plurality of latched outputs.

The two kinds of data thus synchronized are subject to a subtraction and an addition so as to form and output differential color signal data and luminance signal data, respectively. More specifically, an addition circuit 33 forms low frequency region luminance signal data by the addition, and the weighted mean outputs which are inverted in polarity by a sign control circuit 34 form differential color signal data Cr and Cb in a line sequential manner by a subtraction circuit 35.

The same operation as the above described operation is performed with respect to the second interpolated data. Therefore, as the low frequency region luminance signal data, two kinds of data one of which is formed on the basis of the first interpolated data and the other of which is formed on the basis of the second interpolated data. The color signal data Cb is alternately withdrawn from the subtraction circuits 35 of the two same circuits on the basis of the first interpolated data and the second interpolated data, respectively. Similarly, the color signal data Cr is also alternately withdrawn in a similar manner. Then, both of the outputs of the addition circuits 35 are averaged by an average circuit 36 to be withdrawn as a low frequency region luminance signal, and both of the outputs of the subtraction circuits 36 are received by a Cb selection circuit 37 and a Cr selection circuit 38, and therefore, the color signal data Cb and Cr are respectively withdrawn at the same selected outputs of the selection circuits 37 and 38.

Horizontal Interpolation

Figure 6:
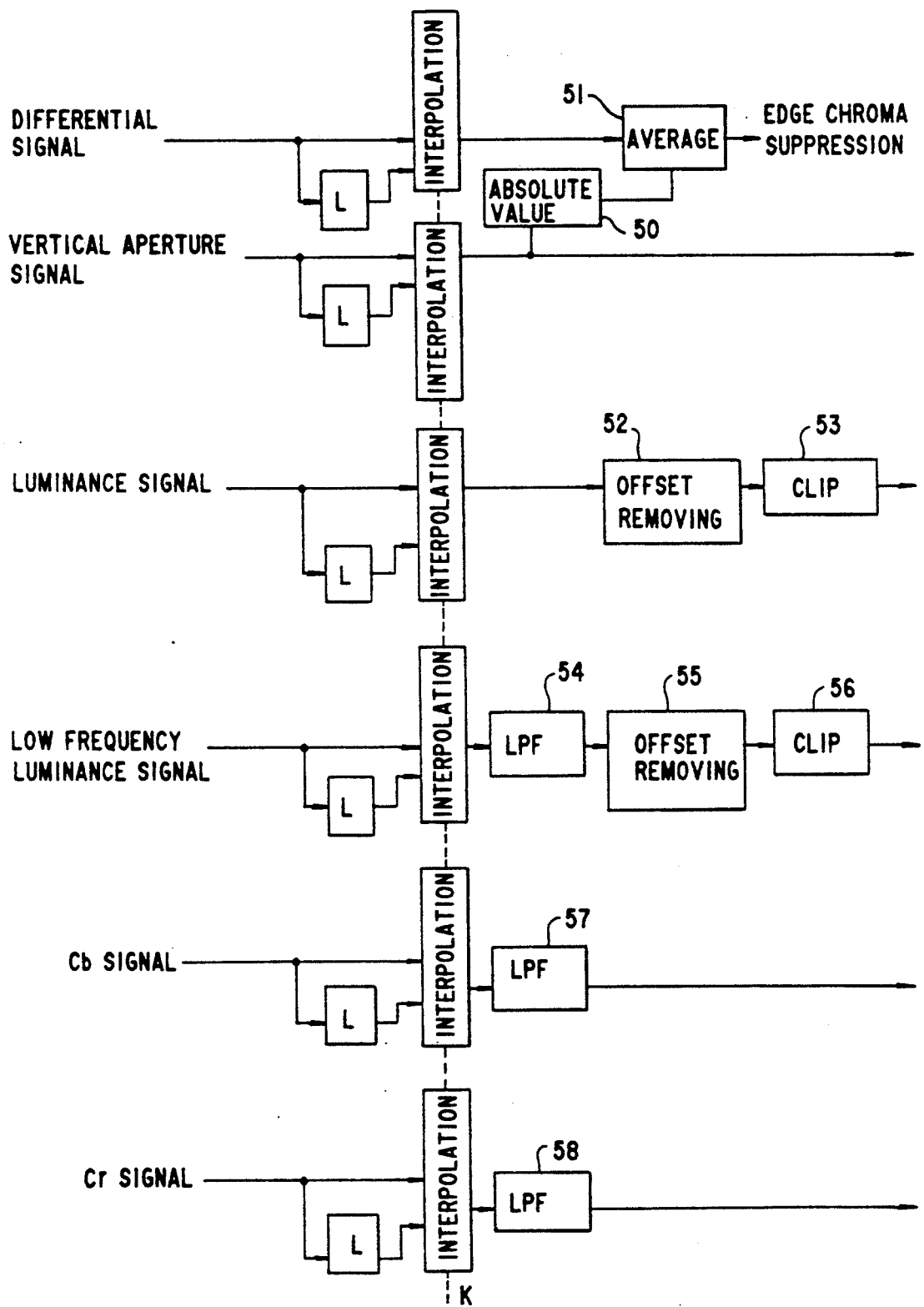
FIG. 6 is a block diagram for specifically showing a horizontal interpolation circuit shown in FIG. 1.

A horizontal interpolation circuit 5 shown in FIG. 1 receives all the above described signal data: that is, the differential signal, the vertical aperture signal with no high frequency noise, the high frequency region luminance signal with no high frequency noise, the low frequency region luminance signal, and the color signals Cb and Cr. The horizontal interpolation circuit 5 is used for the purpose of converting the data in the horizontal direction within the restricted range specified by the electronic zoom function are converted into a predetermined number of data by an interpolation processing. More specifically, the horizontal interpolation circuit 5 divides an interval of the data into eight equal parts, and specifies a desired data position by an approximation, and then, interpolates data of the position in accordance with a proportional allocation method. Therefore, respective input signals are delayed by latch circuits by one clock, and delayed outputs are non-delayed outputs are inputted to the interpolation circuits in each of which the interpolation processing is performed according to a proportional allocation coefficient K, as shown in FIG. 6.

In the embodiment shown, by utilizing the differential signal data and the vertical aperture signal data, a vertical edge chroma suppressing signal is formed. The edge chroma suppressing signal is used for suppressing the color signal component at a portion where the luminance varies largely so as to prevent a color fringing from occurring at that portion.

In order to perform such edge chroma suppression, only the aperture signal data may be utilized in a manner that the aperture signal data being generated at the portion where the change of the luminance is large is converted into absolute value; however, in this embodiment, the differential signal data is also utilized in order to overcome obstacles due to an image pick-up principle of the solid state image sensor.

Figure 7:
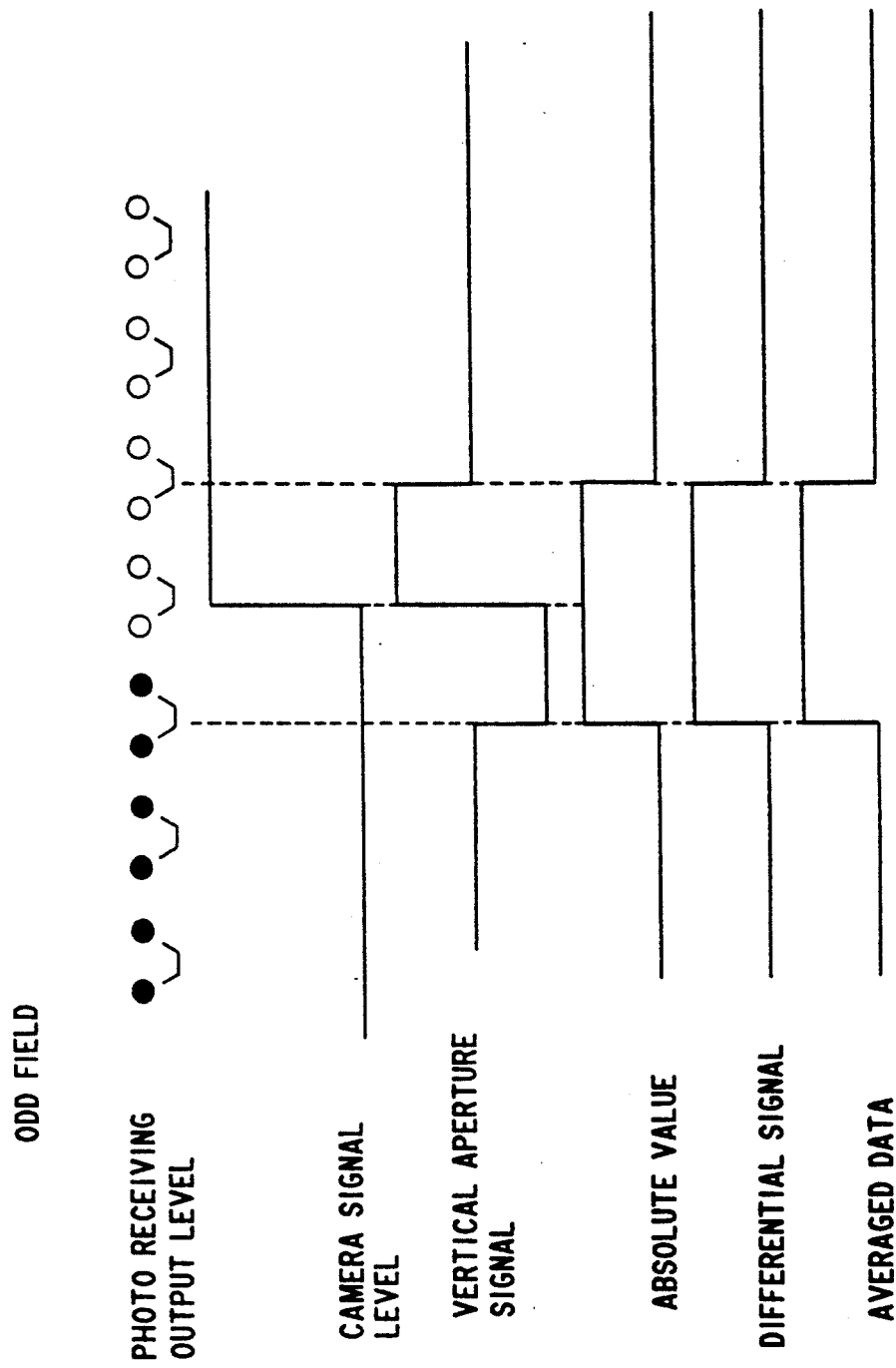
FIG. 7 is an illustrative view showing a principle of an edge chroma suppression in an odd field performed in an edge chroma suppression circuit shown in FIG. 1.

FIG. 7 and FIG. 8 are explanatory views for describing a reason why the differential signal data is to be used. FIG. 7 and FIG. 8 shows the edge chroma suppression principle in the odd field and the even field, respectively. In both these figures, the picture elements of the vertical direction of the image sensor are illustratively shown by circle symbols, and a low luminance detection state and a high luminance detection state are shown by black dots and white dots, respectively. From the image sensor of a single plate type, photo-receiving outputs (picture element outputs) of the successive two lines are added to each other so as to be outputted as a camera signal, and a combination thereof is different from each other in the odd field and in the even field. Therefore, difference occurs in the luminance changing portion of the camera signal between the odd field and the even field. That is, an intermediate value is present in the camera signal shown in FIG. 8. Such a phenomenon is an avoidable phenomenon in the single plate image pick-up device. A problem resides in the intermediate value. More specifically, when the vertical aperture signal is converted into the absolute value, the luminance changing portion in the odd field can be covered by the absolute value, but in the even field, the absolute value output of the intermediate value portion is missed. Therefore, the differential signal obtained by adding the absolute value of a difference between the preceding line and the current line and the absolute value of a difference between the current value and the succeeding lien are required. If the differential signal and the absolute value of the vertical aperture signal are added to each other and an average value of both is evaluated, it is possible to cover the luminance changing portion in both fields. Then, an interpolated signal data of the vertical aperture signal is converted into the absolute value by the absolute value circuit 50, and supplied to an average circuit 51 together with the interpolated signal data of the differential signal, and therefore, the average circuit 51 outputs the edge chroma suppression signal.

Furthermore, an interpolated data of the high frequency region luminance signal from which the high frequency noise component is previously removed is inputted to an offset removing circuit 52 such that the offset which is added to the luminance signal in the clamp circuit 1 is removed, and thereafter, a negative signal component of the interpolated data is clipped by a clip circuit 53. Furthermore, an interpolated data of the low frequency region luminance signal is received by a low-pass filter 54 such that a high frequency noise component is removed, and the offset is removed by an offset removing circuit 55, and thereafter, a negative signal component of the interpolated data is clipped by a clip circuit 56. In addition, an interpolated data of the Cb signal and an interpolated data of the Cr signal are withdrawn via low-pass filters 57 and 58 complementing a characteristic in which the high frequency component is removed by a weighted mean processing.

Aperture Signal Addition

Figure 9:
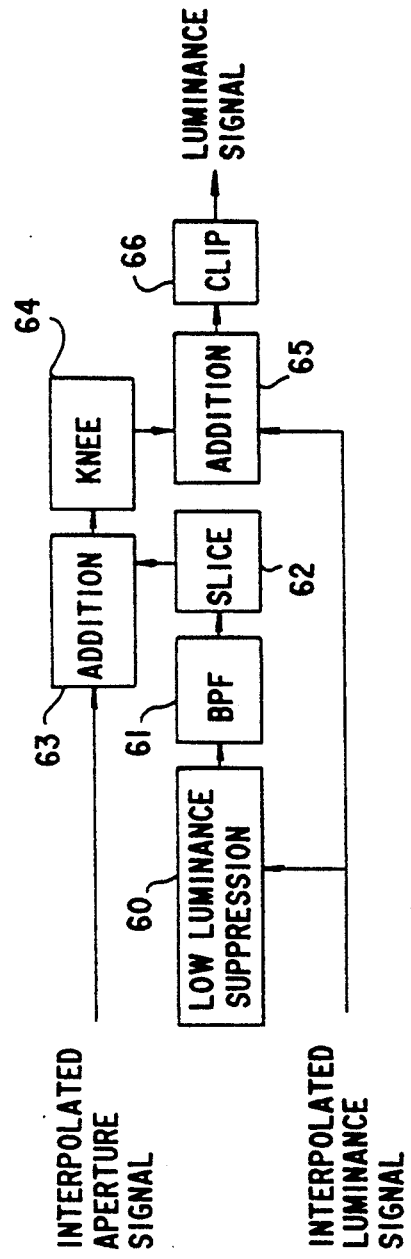
FIG. 9 is a block diagram specifically showing an aperture addition circuit shown in FIG. 1.

The vertical aperture signal which has been interpolated and the high frequency region luminance signal which has been interpolated are supplied to an aperture addition circuit 6 as shown in FIG. 9 in detail. In order to form a horizontal aperture signal, the high frequency region luminance signal is first inputted to a low luminance suppression circuit 60 such that a low luminance component is removed together with a noise component. After removal of the low luminance component, an aperture component is separated by a band-pass filter 61. An output of the band-pass filter 61 is inputted to a slice circuit 62 such that the aperture component not less than a predetermined level is inputted to an addition circuit 63 as the horizontal aperture signal. In the addition circuit 63, the horizontal aperture signal is added to the vertical aperture signal. An added output is inputted to a knee circuit 64 by which a high level portion of the added output is suppressed, and the added output in which the high level portion is suppressed is inputted to an addition circuit 65 as an aperture signal, and the aperture signal is added to the high frequency region luminance signal in the addition circuit 65. An added output from the addition circuit 65 is clipped by a clip circuit 66 at an upper limit and a lower limit so as to be withdrawn as a luminance signal data which has been emphasized at an edge thereof.

RGB Composition

Figure 10:
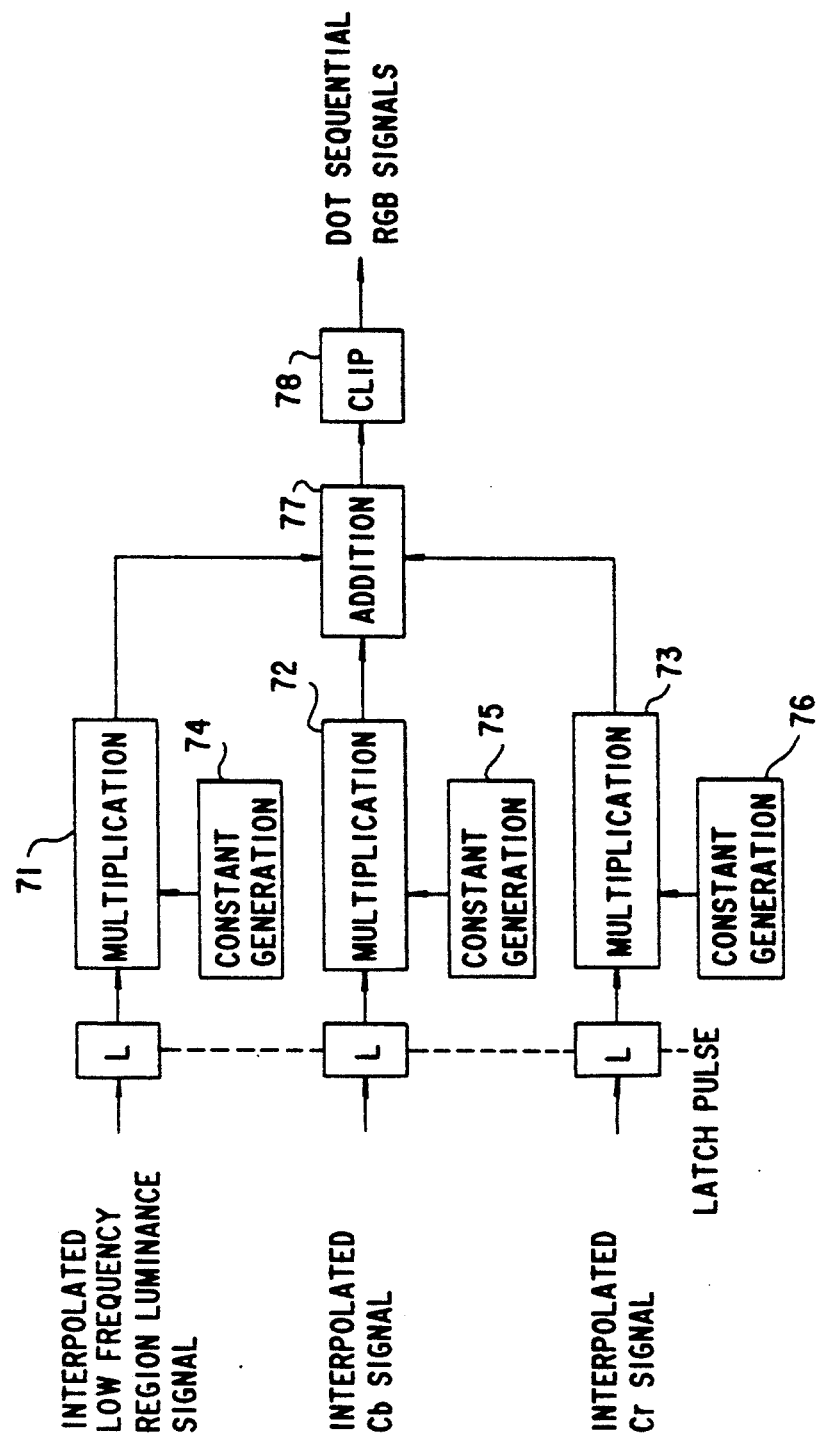
FIG. 10 is a block diagram specifically showing an RGB composition circuit shown in FIG. 1.

In addition, the low frequency region luminance signal which has been interpolated and the Cb and Cr signals which have been respectively interpolated are inputted to an RGB composition circuit 7 as shown in FIG. 10 in detail. In the RGB composition circuit 7, the low frequency region luminance signal data and the Cb and Cr signal data are respectively inputted to latch circuits L such that a data latch processing is performed at the same timing in response to a latch pulse which is generated at a ratio of three clocks to one time. As a result, the respective data are thinned-out by ⅓ for the succeeding states. At first, the respective latched data are inputted to multiplication circuits 71-73, respectively. Three kinds of coefficient which are set on the basis of a white balance control are stored in constant generation circuits 74-76 as to the respective latch data, and therefore, the constant generation circuits 74-76 sequentially generates the coefficients in the order of R, G and B of the primary colors, and the coefficients are supplied to multiplication circuits 71-73. Therefore, the multiplication circuit 71 first multiplies the latched data by the coefficient necessary for forming the R signal. Then, the multiplication circuit 72 multiplies the latched data by the coefficient necessary for forming the G signal, and then, the multiplication circuit 73 multiplies the latched data by the coefficient necessary for forming the B signal, at every latch timing. Multiplied outputs are supplied to an addition circuit 77 at every timing of the multiplication. Therefore, from the addition circuit 77, respective color signals of R, G and B are withdrawn in a dot sequential manner. Such an added output is clipped by a clip circuit 74 so as to be withdrawn as a dot sequential RGB signal data.

Gamma Correction

The camera signal is linear with respect to the light input. On the other hand, a relationship between an input voltage vs. a luminous amount of a Braun tube is non-linear. Therefore, in the video camera, it is necessary to correct as difference thereof. Then, the luminance signal data and the three primary color signal data are inputted to a gamma correction circuit 9 as shown in FIG. 1 so as to be subjected to the above described non-linear processing. However, a low frequency region is too emphasized by a gamma correction characteristic, and therefore, a low level noise is emphasized as to the luminance signal. Therefore, in this embodiment a low luminance suppression circuit 8 is provided at the preceding stage of the gamma correction circuit 9 such that too low level luminance signal and the low level noise can be suppressed. Therefore, from the gamma correction circuit 9, the luminance signal data and the color signal data which are close to the regularity can be withdrawn.

Chroma Suppression by Edge

The dot sequential color signal which has been subjected to the gamma correction is supplied to the edge chroma suppression circuit 10 which functions such that a color gain adjustment coefficient is set on the basis of the edge chroma suppression signal level of the vertical direction which is approximately in proportion to the changing amount of the luminance signal. The color gain adjustment coefficient is set smaller in a portion where the change of the luminance is large, and the color gain adjustment coefficient is set as a standard value at a portion where the change of the luminance is small. The edge chroma suppressing circuit 10 shown in FIG. 1 performs the edge chroma suppression by multiplying the color gain adjustment coefficient by three primary color signals, and therefore, the color signal level is suppressed at the portion where the change of the luminance is large in the vertical direction, and therefore, a pseudo color signal can be suppressed.

Chroma Suppression at High and Low Luminance

Figure 11:
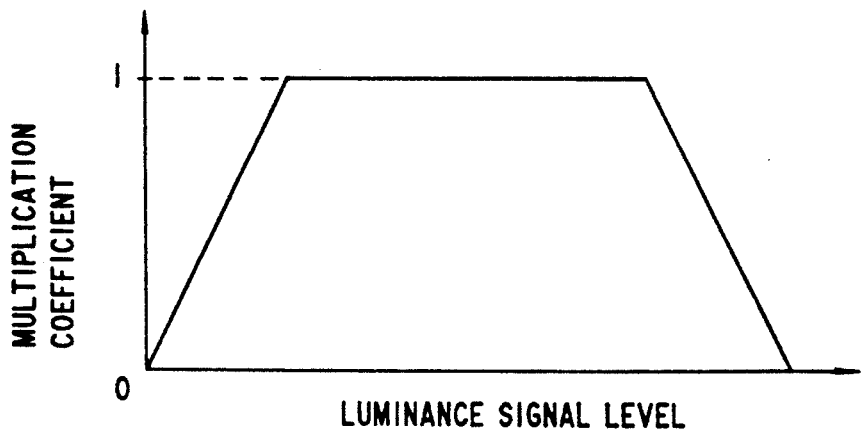
FIG. 11 is an illustrative view showing a multiplication coefficient characteristic for a high and low luminance suppression circuit shown in FIG. 1.

If the respective photo-receiving output levels are saturated at the high luminance portion, the color signal in the camera signal dies not change, and therefore, the Cb and Cr signal which are obtained by the subtractions decrease, and subsequently, a so-called highlight green phenomenon in which a portion that is to be originally white it tinged green because the G signal is relatively emphasized. In addition, in the low luminance portion, a noise is conspicuous because the color component to be originally included is also small. The luminance signal of the low luminance portion is suppressed at the preceding stage of the gamma correction, and no suppression is applied to the color signal. Therefore, in this embodiment, chroma suppressions of the low luminance portion and the high luminance portion are simultaneously performed, and to this end, the chroma edge suppression signal is further inputted to a high and low luminance chroma suppression circuit 11 shown in FIG. 1. The high a nd low luminance chroma suppression circuit 11 receives the luminance signal before the addition of the aperture, and a multiplication coefficient with respect to the luminance signal is set as shown in FIG. 11. That is, the multiplication coefficient is smaller in the high luminance portion and the low luminance portion. By processing a multiplication of the multiplication coefficient thus set by the chroma edge suppression signal, the color signal levels of the high luminance portion and the low luminance portion can be suppressed.

Video Selection

A signal to be outputted from the video camera is not only the video signal obtained by picking-up the image, and as necessary, an adjustment color signal is also to be outputted. Therefore, in this embodiment a video selection circuit 12 shown in FIG. 1 is provided, and the video selection circuit 12 performs a selection that the luminance signal which has been subjected to the gamma correction and the dot sequential RGB color signal which has been subjected to the high and low luminance chroma suppression are to be withdrawn or that a test pattern signal generated internally is to be withdrawn.

Luminance Signal Processing

It is necessary to make the luminance signal withdrawn from the video selection circuit 12 be coincident in timing with the color signal before the luminance signal is converted into an analog signal. To this end, the luminance signal is inputted to a delay circuit 13 to be delayed by a predetermined time. Furthermore, a black level of the delayed output is to be defined at a specific level of the video signal, and therefore, a predetermined level is added to the delayed output in the video period only by a setup addition circuit 14 shown in FIG. 1. There are no synchronization signals in an output of the setup addition circuit 14. Therefore, a synchronization signal addition circuit 15 which receives the output of the setup addition circuit 14 adds synchronization signals having negative polarities and including a pedestal portion to the setup output in the blanking period. The luminance signal to which t he synchronization signals are added is supplied to a D/A conversion circuit 23 to be converted into an analog signal. The analog luminance signal is withdrawn as an output of this integrated circuit.

RGB Differential Color Signal Matrix

The dot sequential RGB signals through the video selection circuit 14 is inputted to an RGB/differential color signal matrix circuit 16 to be converted into differential color signals. The matrix circuit 16 forms the differential color signals represented by the following equations at a standard state.

$$R-Y=0.7(R-G)-0.1(B-G)$$

$$R-Y=0.3(R-G)+0.9(B-G)$$

In converting, first, operations of (R−Y) and (B−Y) are performed, and succeedingly, inherent coefficients are multiplied thereto. The inherent coefficients can be changed with a similarity in order to perform adjustment of the color signal levels. In a case of the change of the inherent coefficients, if the coefficients not less than "1" is permitted to be used, a circuit scale becomes large. Therefore, the coefficient "0.9" is too large for forming the (B−Y). Therefore, this embodiment shown is devised such that the coefficient for the (G−B) is made half with respect to the circuit which forms the (R−Y) signal and the multiplied output is added twice.

Figure 12:
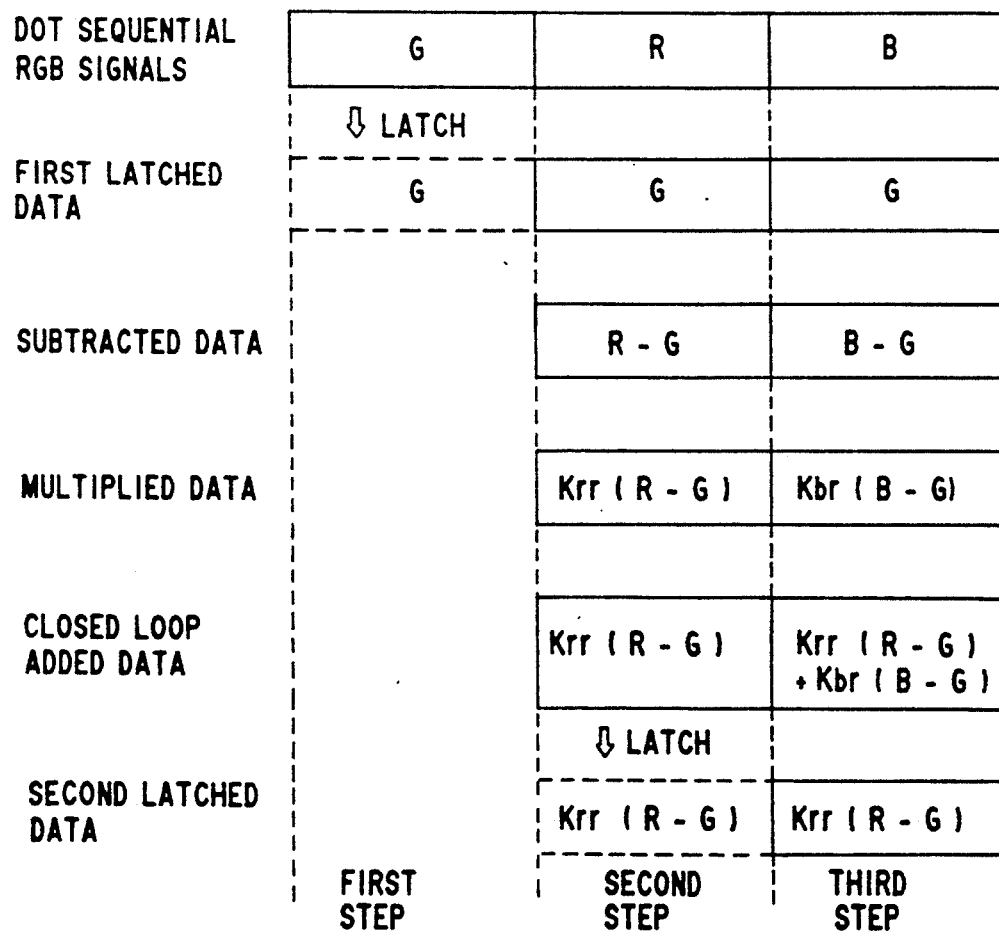
FIG. 12 is an illustrative view showing a principle of R-Y signal conversion performed in an RGB/differential color signal matrix shown in FIG. 1.
Figure 13:
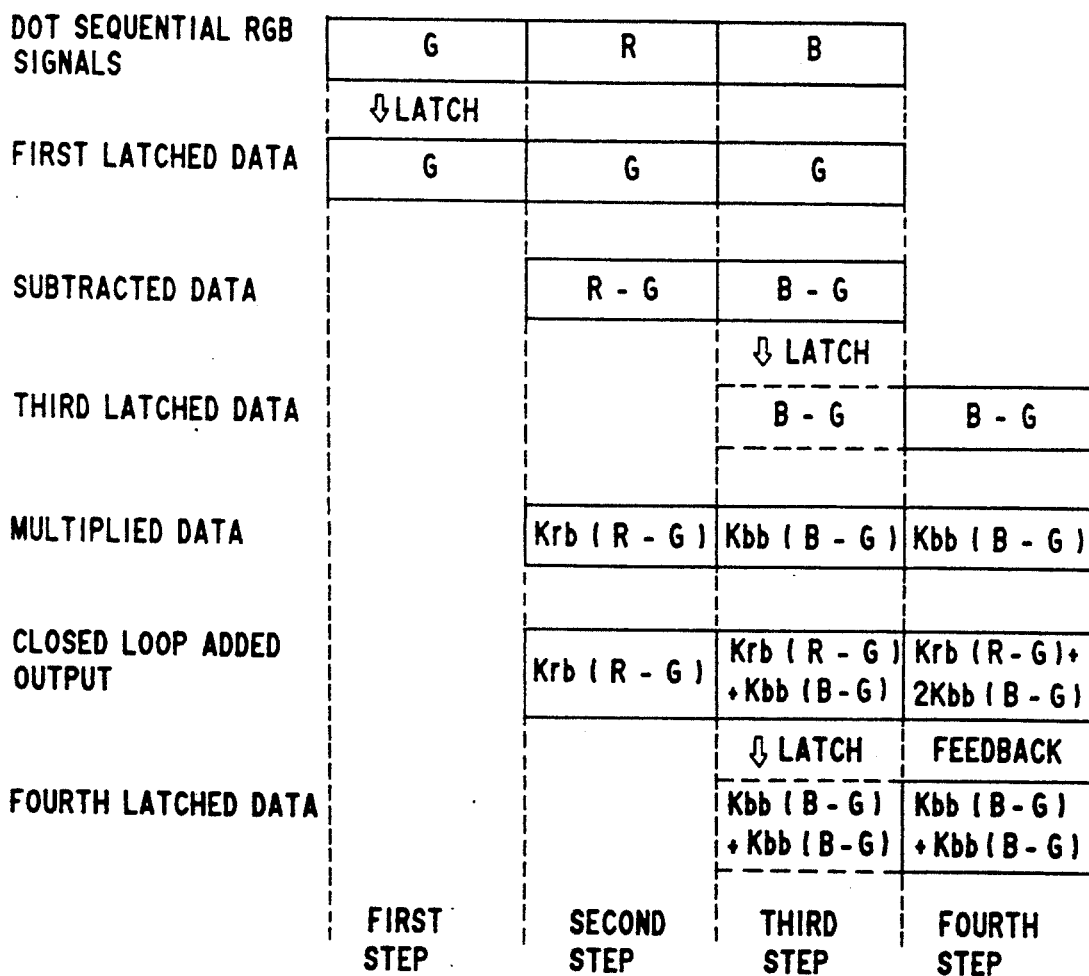
FIG. 13 is an illustrative view showing a principle of a B-Y signal conversion performed in an RGB/differential color signal matrix shown in FIG. 1.
Figure 14:
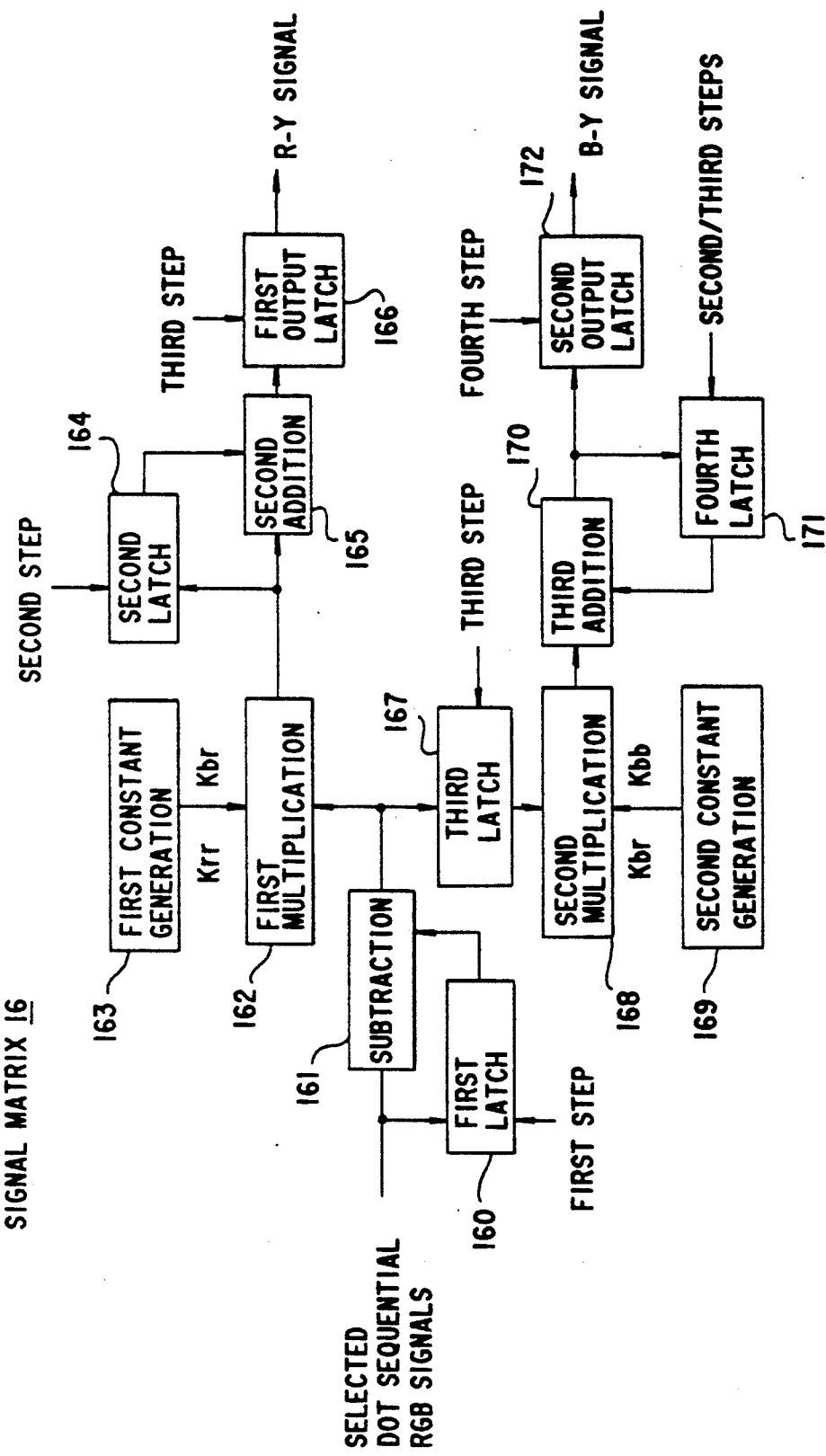
FIG. 14 is a block diagram specifically showing the RGB/differential color signal matrix.

In the following, an operation of the circuit of the embodiment shown in FIG. 14 will be described with reference to FIG. 12 and FIG. 13. On the assumption that a first step is an input state of G signal, that a second step is an input state of R signal, that a third step is an input stage of B signal, and that a fourth step is an input state of succeeding G signal. Therefore, in order to form the (R−G) signal and the (B−G) signal, the G component which is previously inputted is latched in a first latch circuit 160 in the first step. A subtraction circuit 161 performs operations of (R−G) and (B−G) in the second step and the third step, respectively. In order to form the (R−Y) signal, a first multiplication circuit 162 multiplies Krr=0.7 generated by a first constant generation circuit 163 by the (R−G) signal in the second step. In the third step, Kbr=0.1 generated by the first constant generation circuit 163 is multiplied by the (B−G) signal in the third step. A second latch circuit 164 latches Krr(R−G) in the second step, and a second addition circuit 165 forms a desired (R−Y) component in the third step, an operation result is latched by a first output latch circuit 166. In addition, in order to form the (B−Y) signal, a third latch circuit 167 latches the subtracted output in the third step. A second multiplication circuit 162 multiplies Krb=0.3 generated by a second constant generation circuit 169 by the (R−G) signal in the second step. In addition, in the third step, the second multiplication circuit 162 multiplies Kbb=−0.45 generated by the second constant generation circuit 169 by the (B−G) in the third step, and multiplies again Kbb=−0.45 generated by the second constant generation circuit 169 by the (B−G) in the fourth step. A fourth latch circuit 171 latches an output of a third addition circuit 170 in the second and third steps, and the third addition circuit 170 performs an addition of the multiplied data and the fourth latched data being fed-back. Therefore, the third addition circuit 170 outputs Krb(R−G), Krb(R−G)+Kbb(R−Y), and Krb(R−G)+2Kbb(R−Y) in the second step, the third step and the fourth step, respectively. A second output latch circuit 17 latches a desired output in the fourth step. Thus, in a fifth step (not shown), both the differential color signals are formed.

Low Saturation Suppression

Figure 15:
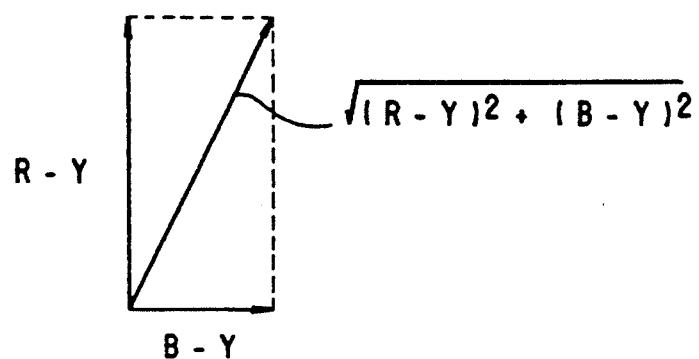
FIG. 15 is an illustrative view showing a principle of saturation evaluation performed in a low saturation chroma suppression circuit shown in FIG. 1.

It becomes necessary to suppress a low saturation portion of the color signal according to a user is perference. As shown in FIG. 15, it is known that the saturation is equal to a length of a resultant force when the respective differential color signals are represented by orthogonal vectors. Therefore, the saturation can be surely evaluated by squaring the levels of the respective differential color signals and by raising to ½ power as a whole. However, such operations become complex, and therefore, a circuit scale becomes large.

Therefore, in the low saturation suppressing circuit 17 of this embodiment, the saturation is approximately evaluated. For example, there is a method wherein a first quadrant of FIG. 15 is divided into a lattice fashion and saturations, each corresponding to each cross in the lattice, are stored in advance, and the saturation is determined by converting the respective differential color signals into the absolute values and by seeking each of the absolute values that corresponds more; to the cross of the lattice, or a method wherein an area shown in FIG. 15 is appropriately divided into regions and the saturation is approximately evaluated by a simple primary operation that is set in each region. Next, a suppression coefficient is specified according to the evaluated saturation, and the suppression coefficient is multiplied by the respective differential color signals, and therefore, the saturation in the low saturation portion can be suppressed.

However, in the above described low saturation suppression, there is a problem with respect to preference, and therefore, it is possible to stop the function of the low saturation suppression according to an external operation.

Sampling Frequency Conversion

The differential color signals which have been subjected to the low saturation suppression is outputted from a low-pass filter 18 in a manner that a high frequency region thereof is limited. In this video signal processing integrated circuit requires data equal to four times a color subcarrier frequency; that is, 4 fsc in modulating the color signal. Therefore, in a case where a frequency of the driving clock is 8/3 fsc, the input data is sampled with 4 fsc to make the data density of the differential color signal coefficient with 4 fsc. When the data of 8/3 fsc is converted into the data of 4 fsc by a sampling conversion circuit 19 shown in FIG. 1, a noise component of 4/3 fsc occurs. Therefore, in this embodiment shown, after the sampling frequency conversion, the 4/3 fsc components is trapped.

Burst Addition

There are no reference signals equal to a color burst signal in the camera signal, and therefore, in this embodiment, the sampled output is inputted a burst addition circuit 20 shown in FIG. 1 such that burst data equal to a standard level of a burst signal is superposed on a burst signal superposing portion of the horizontal blanking period of the sampled output.

Color Encode

The respective differential color signals are to be subjected to a quadrature phase modulation to obtain a signal of one channel. In a case where the quadrature phase modulation is digitally performed, the data of 4 fsc is very convenient. That is, in the NTSC standard, only by sequentially selecting the differential color signals in the order of (B−Y), (R−Y), −(B−Y) and −(R−Y), the quadrature phase-modulated data can be formed. Such a selecting process can be easily performed by a processing for alternately selecting the differential color signals and a processing for inverting a sign of the differential color signals. In addition, if the order for inverting the sign and a processing speed are modified, it is possible to easily convert the differential color signals into the PAL standard.

Then, in this embodiment, the differential color signals to which the burst data is added are inputted to an encode circuit 21 to perform the data selection and the sign inverting process.

D/A Conversion

The data thus modified is to be converted into an analog signal by a D/A conversion. However, in a normal D/A conversion circuit, there is only an ability for converting the input data having the positive sign into an analog signal. Therefore, in this embodiment, a constant addition circuit 22 is provided at the preceding state of D/A conversion circuit 24 such that the input data is D/A converted in a state where values of all the data is made positive. Thus, each of modulated color signals is produced as an output of the integrated circuit.

Digital Output

The integrated circuit of this embodiment outputs not only the above described analog signals but also the luminance signal and the differential color signals in a digital manner. The luminance signal is withdrawn at the preceding stage of the D/A conversion circuit 23 and the differential color signals are withdrawn at the preceding stage of the sampling conversion circuit 19.

In the above described embodiment, it is possible to perform all the interpolations by providing only three line memories in the vertical interpolation circuit due to the synchronization process of the color information and the vertical interpolation processing.

Second Embodiment

Figure 16:
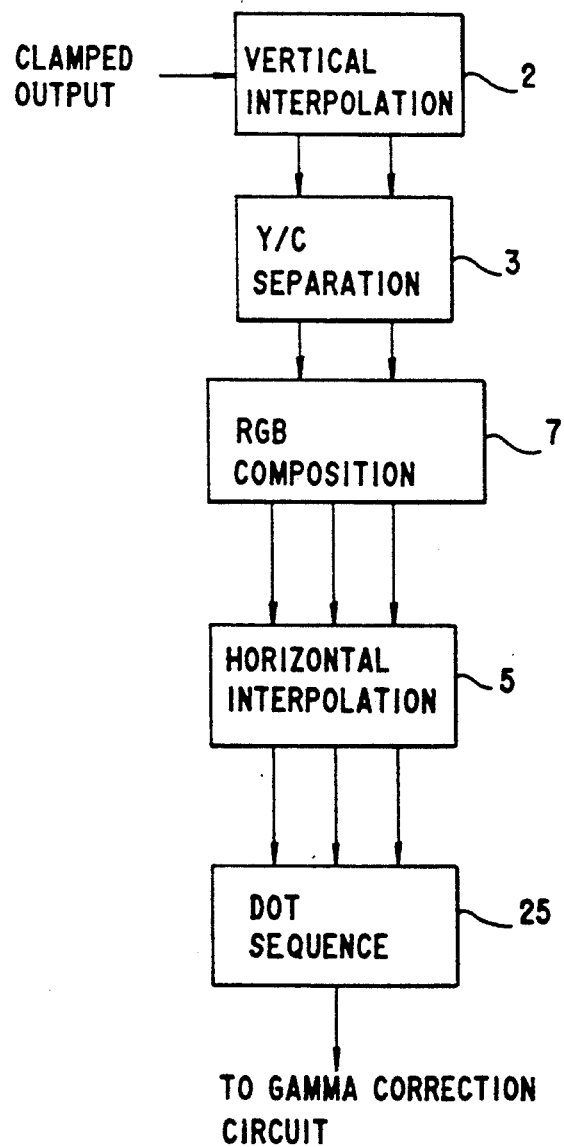
FIG. 16 is a block diagram showing major portions of a second embodiment according to the present invention.

Furthermore, in the above described first embodiment, the RGB composition circuit 7 is provided at the succeeding stage of the horizontal interpolation circuit 5; however, according for convenience in design, as shown in FIG. 16, a relationship of both may be inverted. That is, the horizontal interpolation circuit 5 may be provided at the succeeding stage of the RGB composition circuit 7 such that the horizontal interpolated data can be supplied to a dot sequence circuit 25.

Third Embodiment

Figure 17:
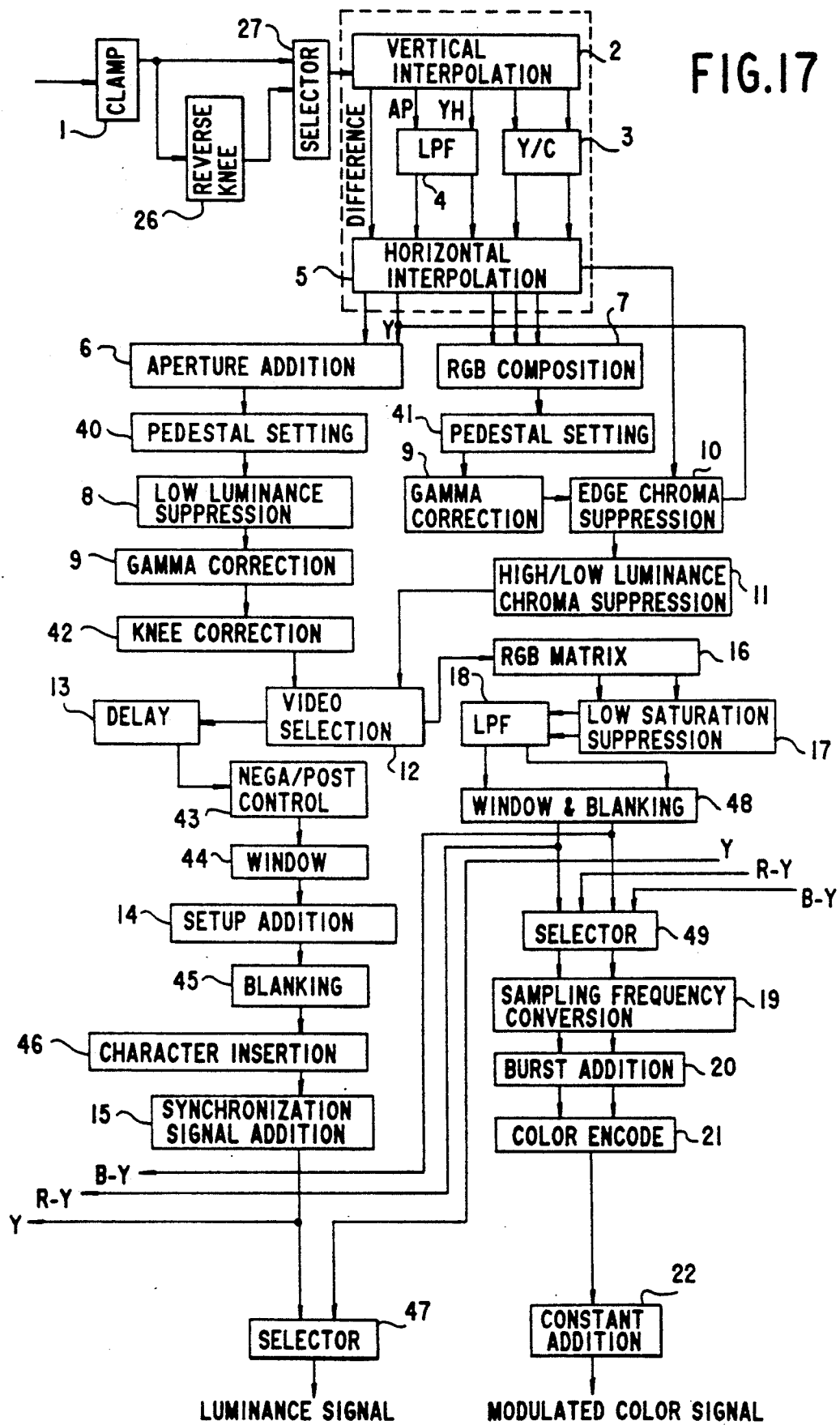
FIG. 17 is a block diagram showing major portions of a third embodiment according to the present invention.

Furthermore, FIG. 17 is a block diagram showing a video signal processing circuit according to another embodiment of the present invention, and the same reference numerals are used for representing the same or similar portions as that of FIG. 1, and therefore, descriptions of these components will be omitted here.

Figure 18:
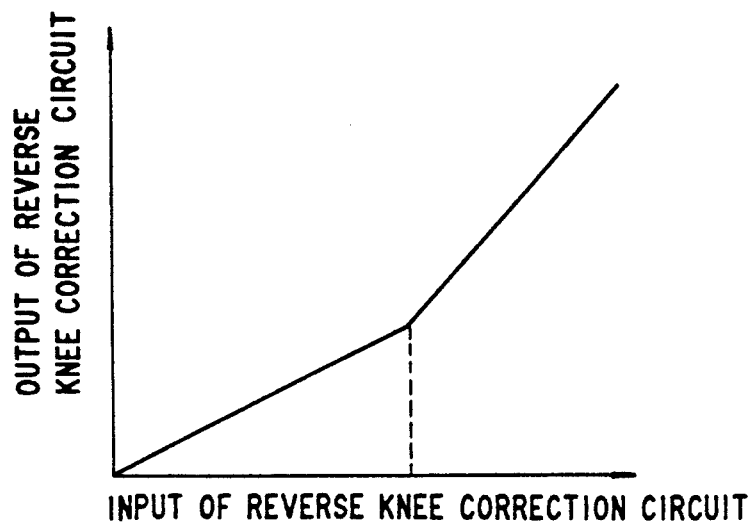
FIG. 18 is an illustrative view showing an input/output characteristic of a reverse knee correction performed in a reverse knee correction circuit shown in FIG. 17.

A reference numeral 26 denotes a reverse knee correction circuit for performing a reverse knee correction of the output from the clamp circuit 1 as shown in FIG. 18. The reverse knee correction circuit 26 is a circuit for restoring the analog luminance signal which has been subjected to the knee correction into the original characteristic. In addition, in an input/output characteristic of such a knee correction, an output level with respect to an input level has a large gradient within a first range that the input level is small and a small gradient within a secon range that the input level is larger than that of the first range. Therefore, if no knee correction is applied to the signal, it is not necessary to use the reverse knee correction circuit 26, and therefore, in this embodiment shown, it is possible to select whether or not the analog luminance signal is to be inputted to the reverse knee correction circuit 27 by a selector 27.

A reference numeral 40 denotes a pedestal setting circuit for setting a pedestal level of the output from the aperture signal addition circuit 6, and a reference numeral 41 denotes a pedestal setting circuit for setting a pedestal level of the output of the RGB composition circuit 7.

Figure 19:
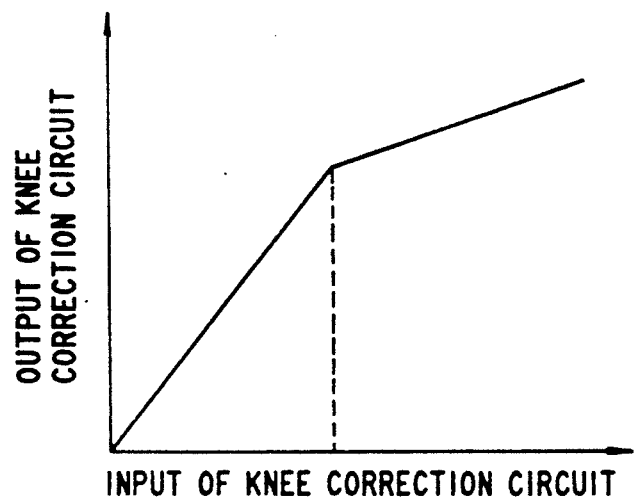
FIG. 19 is an illustrative view showing an input/output characteristic of a knee correction performed in a knee correction.

A reference numeral 42 denotes a knee correction circuit having an input/output characteristic by which the change of the highlight portion of the luminance signal after the digital gamma correction can be suppressed. More specifically, in the knee correction circuit 42, a relationship between the input signal level and the output signal level is set as shown in FIG. 19 such that a gradient becomes large in a first range that the input signal level is low and the gradient becomes small in the second range that the input signal level is higher than that of the first range.

In addition, it may be considered that the knee correction circuit 42 is provided at the preceding stage of the gamma correction; however, it is preferable that the knee correction circuit 42 is provided at the succeeding stage of the gamma correction because of the following reason. More specifically, in a case where the number of changing points of the knee correction is small, because the characteristic of the luminance signal is largely changed before and after each of the changing points, the change before and after the changing point becomes to be conspicuous. However, the gain of the output after the gamma correction become smaller as the input signal level becomes larger, and therefore, the change before and after the changing point becomes not to be conspicuous when the knee correction is performed after the gamma correction. In this embodiment, the knee correction circuit 42 is arranged at the preceding stage of the video selection circuit 12 such that the signal for adjustment selected by the selection circuit 12 can not be subjected to the knee correction.

In addition, a reference numeral 43 denotes a negative/positive control circuit for controlling the output of the delay circuit 13 to be inverted when the video signal is displayed in a negative manner.

A reference numeral 44 denotes a window circuit connected to the negative/positive control circuit 44. The window circuit 44 is a circuit for making the luminance of the display portion other than the portion where the image is displayed on the screen, that is, the luminance of the portion other than window be a constant gray level in performing a fade function.

A reference numeral 45 denotes a blanking circuit connected to the setup circuit 14, in which the blanking portion is made at a predetermined black level.

A reference numeral 45 denotes a character insertion circuit connected to the blanking circuit 45, by which a character can be displayed in a manner that the same is superposed on the image.

A reference numeral 47 denotes a selector which selectively outputs the output of the synchronization signal addition circuit 15 or the luminance data applied from the external. In addition, the output of the synchronization signal adding circuit 15 is also supplied to an external output terminal.

On the other hand, a reference numeral 48 denotes a window and blanking circuit inserted at the succeeding stage of the low-pass filter 18 within the color signal path, and the window and blanking circuit 48 is a circuit for detecting the color signal of the display portion other than the window and the blanking portion.

A reference numeral 48 denotes a selector which selectively outputs an output of the window and blanking circuit 48 or the differential color signals applied from the external. In addition, the output of the window and blanking circuit 48 is also supplied to at the external output terminal as similar to the above described luminance signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal processing circuit incorporated in an integrated circuit for receiving a digital camera signal obtained through an A/D conversion of an analog camera signal which is outputted by an image sensor, and for performing a digital signal processing so as to produce a luminance signal and a color signal, said video signal processing circuit, comprising:

vertical interpolation means for performing a vertical interpolation of the digital camera signal of one channel within an image area which is set by an electronic zoom function and for producing two kinds of vertically interpolated data having color information different from each other;

YC separation means, operably coupled to said vertical interpolation means, for receiving said vertically interpolated data and producing two kinds of differential color data;

horizontal interpolation means, operably coupled to said YC separation means, for receiving said differential color data and producing two kinds of horizontally interpolated data correspondingly to said two kinds of vertically interpolated data; and color signal composition means, operably coupled to said horizontal interpolation means, for converting said horizontally interpolated data into three primary color signals.

2. A video signal processing circuit incorporated in an integrated circuit for receiving a digital camera signal obtained through an A/D conversion of an analog camera signal which is outputted by an image sensor, and for performing a digital signal processing so as to produce a luminance signal and a color signal, said video signal processing circuit, comprising:

vertical interpolation means for performing a vertical interpolation of the digital camera signal of one channel within an image area which is set by an electronic zoom function so as to form and output two kinds of vertically interpolated data having color information different from each other;

two-channel Y/C separation means, operably coupled to said vertical interpolation means, for receiving said vertically interpolated data and producing two kinds of differential color data;

color signal composition means, operably coupled to said Y/C separation means, for converting said differential color data into three primary color data; and horizontal interpolation means, operably coupled to said color signal composition means, for receiving said three primary color data and producing two kinds of horizontally interpolated data correspondingly to said two kinds of vertically interpolated data.

3. A video signal processing circuit incorporated in an integrated circuit for receiving a digital camera signal obtained through an A/D conversion of an analog camera signal which is outputted by an image sensor, and for performing a digital signal processing so as to produce a luminance signal and a color signal, said video signal processing circuit, comprising:

gamma correction means for gamma-correcting luminance data after Y/C separation; and knee correction means, operably coupled to said gamma correction means, provided at a succeeding stage of said gamma correction means, wherein said knee correction means has an input/output characteristic which is: (a) a first linear line with a first incline within a first range where an input level is low, and (b) a second linear line with a second incline smaller than said first incline within a second range where the input level is larger than that of said first range.

* * * * *